UNITED STATES PATENT OFFICE.

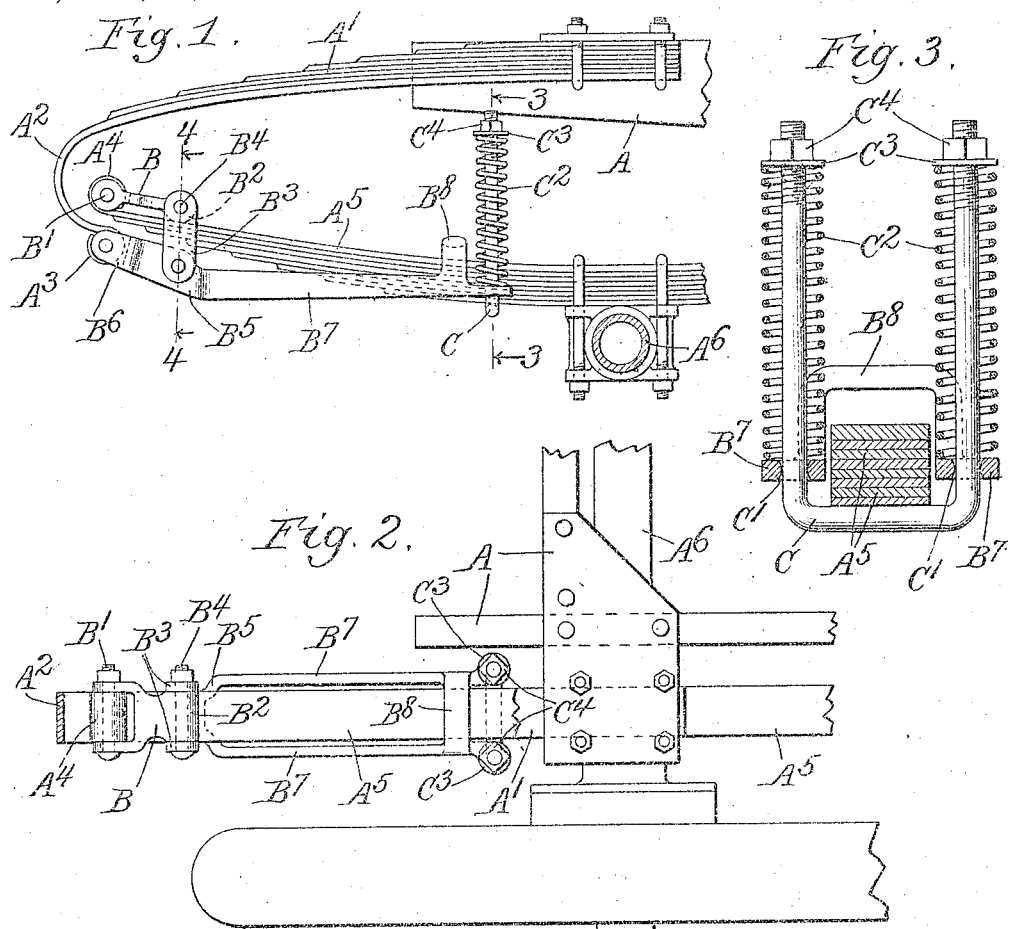

LEWIS P. HALLADAY, OF STREATOR, ILLINOIS.

SHOCK-ABSORBER.

1,201,289.

Specification of Letters Patent.

Patented Oct. 17, 1916.

Application filed December 17, 1915. Serial No. 67,348.

*To all whom it may concern:*

Be it known that I, LEWIS P. HALLADAY, a citizen of the United States, residing at Streator, in the county of La Salle and State of Illinois, have invented a certain new and useful Improvement in Shock-Absorbers, of which the following is a specification.

My invention relates to improvements in shock absorbers or auxiliary spring suspensions for motor vehicles and the like.

It has for one object to provide an auxiliary spring suspension which may be used in connection with the usual type of automobile or motor vehicle.

Another object is to provide such an auxiliary spring suspension as will be easily and conveniently attached and render it in proper operative condition at all times, and such as will require no special arrangement or adjustment to render it operative in connection with the ordinary type of motor vehicles.

My invention is illustrated more or less diagrammatically in the accompanying drawings, wherein—

Figure 1 shows a section through an automobile rear axle, with parts omitted and parts broken away, showing a three-quarter elliptical spring in part elevation and my device in position thereon in part section; Fig. 2 is a plan of the parts shown in Fig. 1 with parts omitted and parts broken away; Fig. 3 is a section along the line 3—3 of Fig. 1; Fig. 4 is a section along the line 4—4 of Fig. 1; and Fig. 5 is a side elevation of a modified form showing the device attached to a semi-elliptic spring.

Like parts are indicated by like letters throughout the several figures.

A represents the motor vehicle's chassis frame. On this chassis frame is anchored the quarter elliptical spring $A^1$ having a scroll end $A^2$. This scroll end is provided at its terminus with a spring bolt eye $A^3$ located immediately below a similar eye $A^4$ on the one-half elliptical spring $A^5$, which one-half elliptical spring is supported at an intermediate point on the axle $A^6$. In the ordinary automobile spring construction there will be a link connecting the end of the scroll quarter spring and the end of the half elliptical spring. In my device, however, I dispense with the link and substitute therefor the pair of levers as shown.

B is a tie-link attached by means of the bolt $B^1$ to the eye $A^4$. Its free end $B^2$ rests upon the upper surface of the spring $A^5$. Links $B^3$ $B^3$ depend downwardly from the end of this tie-link being attached thereto by the spring bolt $B^4$. The lever $B^5$ is pivotally suspended from links $B^3$. It is forked as at $B^6$ to engage the spring eye $A^3$ and is forked as at $B^7$ to permit the spring $A^5$ to pass between its forked ends. These forked ends are tied together by the yoke $B^8$ which overlies the spring $A^5$.

C is a U-shaped anchor yoke, the center of the U resting against the bottom of the spring $A^5$. The arms of the U pass up through perforations $C^1$ in the forked arms $B^7$. Springs $C^2$ surround such arms, rest upon the upper surfaces of the forked arms $B^7$ and abut upon their upper ends on washer $C^3$ and held in position by nuts $C^4$ on the upper ends of the U yoke arms.

In the modified form shown in Fig. 5, the lever D is pivoted at its rear end on the chassis frame $D^1$ and is pivotally mounted near its rear end on the link $D^2$ having the boss $D^3$ resting upon the upper surface of the spring $D^4$. The coil spring $D^5$ is connected to the free end of the lever, being mounted on the spring $D^4$. The yoke $D^6$ connects pivotally the lever D with the end of the chassis frame $D^1$.

It will be evident that while I have shown in my drawings an operative device, still many changes might be made both in size, shape and arrangement of parts, without departing from the spirit of my invention, and I wish therefore that my drawings be regarded as in a sense diagrammatic.

The use and operation of my device is as follows: It is of course well understood that the ordinary type of flat leaf spring used in automobile and motor vehicle suspension has manifest limitations. If the flat spring is made powerful enough to carry the weight of the vehicle and protect the parts from direct road shocks, the spring becomes so powerful that it is insensitive or substantially insensitive to minor shock or vibration. In so far as these minor shocks are concerned, the spring operates as a rigid member. If you make it so flexible that it does not so operate, then it is not strong enough to adequately support the load under circumstances of greater stress. It has been proposed to remedy this difficulty by interposing between the motor vehicle and the axle, somewhere in the spring suspension, a coil spring with indirect tension or indirect compression. This coil spring may be made more flexible, and having a different range of vibration it tends to overcome the difficulty, but since the full load must be supported by this coil spring, the spring itself must be a comparatively rigid and heavy structure and the same defects are found in it in a lesser degree to be sure than are found in connection with the heavy leaf spring. The lever which in my invention is interposed between the spring members or between the spring member and the chassis frame permit the use of a lighter, more flexible auxiliary spiral spring. The result is that as a vehicle passes over a bump or obstruction, this light spring freely gives, and the occupants of the vehicle are protected from the shock. The lever as provided furnishes a predetermined and pre-arranged anchorage for both ends of the spring. This spring may be in compression or in tension.

In the two modifications which I have suggested, namely, where the lever is used with the semi-elliptic and three-quarter elliptic spring, it will be noted that the load on the lever tends to rotate it about a fulcrum. The load is applied about a short lever arm and is resisted by a yielding force acting through a long lever arm, thus a light flexible spring may be used, in one instance such as is illustrated in my drawings. I would use in an automobile, a so-called 100 pound spring wherein if I was to put the coil spring directly at the end of the elliptic spring, I would have to use a 500 pound spring. Of course the light spring is more flexible and resilient and responds more quickly in traveling through a longer path; absorbs a shock in a more satisfactory and effective manner than if a light short spring were used in traveling through a short path. It will be noted that in the first case the device is self-contained, that is, it may be mounted entirely on the spring without interference with the chassis body in any way. The fulcrum is fastened by the tie-link at some point on top of the axial supported spring. The coil spring and its yoke are positioned upon the axle supported spring by the lever, and the parts are free to move through reasonable limits without interference and without doing any damage. An increase in pressure tends of course to rotate the lever arm in a counter-clockwise direction and compress the spring.

In the modified form shown in Fig. 5 the increase in pressure such as caused by striking a bump, causes the end of the spring and the chassis frame to approach, thus tending to cause rotation of the lever in a counter-clockwise direction, thus flexing the coil spring. The spring may be in compression or tension, may be anchored either on the flat leaf spring or on the chassis, but in every case the load is taken by a yielding force applied through a long lever arm and the resisting force or yielding force thus acts through a relatively long travel, thus easily and smoothly resisting the movement of the parts.

I claim:

1. A combination with a flat leaf spring suspension for motor vehicles and the like, of an anchor link pivoted on the spring, a lever suspended beneath the spring from the inner end of said anchor link, a pivot connection between one end of the lever and the vehicle, and yielding means for preventing rotation of said lever, said lever being bifurcated and having its arms located thereon on either side of the spring, a tie-yoke extending across said spring between said bifurcate arms and adapted to tie the free bifurcated ends of the lever together and serve as a stop which limits the downward movement of the lever.

2. A combination with a flat leaf spring suspension for motor vehicles and the like, of an anchor link pivoted on the spring, a lever suspended beneath the spring from the inner end of said anchor link, a pivot connection between one end of the lever and the vehicle, and yielding means for preventing rotation of said lever, a yoke engaging the spring in movable engagement with the lever, and springs interposed between said yoke and said lever.

3. A combination with a flat leaf spring suspension for motor vehicles and the like, of an anchor link pivoted on the spring, a lever suspended beneath the spring from the inner end of said anchor link, a pivot connection between one end of the lever and the vehicle, and yielding means for preventing rotation of said lever, said lever being bifurcated and having its arms located thereon on either side of the spring, a yoke engaging the spring in movable engagement with the lever and springs interposed between said yoke and said lever.

4. A combination with a flat leaf spring suspension for motor vehicles and the like, of an anchor link pivoted on the spring, a lever suspended beneath the spring from the inner end of said anchor link, a pivot connection between one end of the lever and the vehicle, and yielding means for preventing rotation of said lever, said lever being bifurcated and having its arms located thereon on either side of the spring, a tie-yoke extending across said spring between said bifurcate arms, a yoke engaging the spring in movable engagement with the lever and springs interposed between said yoke and said lever.

In testimony whereof, I affix my signature in the presence of two witnesses this 14th day of December 1915.

LEWIS P. HALLADAY.

Witnesses:
GENEVA HIRTH,
MINNIE M. LIMPENAU.